March 21, 1961 B. K. SMITH 2,976,527

DIGITAL ATTENUATOR

Filed July 17, 1958

INVENTOR.
BRUCE K. SMITH
BY Joseph Weingarten
ATTORNEYS 2,976,527

DIGITAL ATTENUATOR

Bruce K. Smith, Waltham, Mass., assignor to Epsco, Incorporated, Boston, Mass., a corporation of Massachusetts Filed July 17, 1958, Ser. No. 749,116

1 Claim. (Cl. 340—347)

The present invention relates in general to signal translation and more particularly concerns a novel attenuator for combining analog and digital signals to provide an analog output signal. The novel attenuator is especially useful for rapidly effecting the conversion of a digital signal to an equivalent analog signal with great accuracy. Yet, the associated circuit is relatively free of complexity and operates with great reliability.

Digital attenuators are well known in the computer art. Basically, these attenuators comprise a plurality of resistors which may be selectively connected in parallel. When it is desired to attenuate an input signal in accordance with a binary number, the resistance values are related to the smallest thereof by a factor of $2^n$ where $n$ is the significance of the binary number digit represented by a respective resistance. An output signal is derived across the parallel combination of those resistors whose associated binary digit is a One. While these attenuators operate satisfactorily in many systems, the varying output impedance presented as different combinations of resistances are selectively connected is a serious disadvantage when used in transistorized systems.

The problem of the varying output impedance is not so serious in electron tube systems since there is a very high degree of isolation between the input and output of a vacuum tube circuit. However, there is a significant degree of interaction between input and output of transistor circuits. Moreover, the degree of interaction is related to the output impedance of the transistor, the output impedance being finite and difficult to maintain at a predictable constant value even when the transistor is cut off. As a result, variations in impedance at the input cause the signal level at the output to vary accordingly. This level is then a function of both the input signal amplitude and the impedance of the source. Consequently, it is difficult to establish a precise relationship between a digital number and output level by selectively connecting resistances in parallel.

The present invention contemplates and has a primary object the provision of a digital attenuator which presents a substantially constant impedance independently of the degree of attenuation imparted to an input signal.

It is another object of the invention to provide a digital attenuator in accordance with the preceding object especially suitable for use in a fully transistorized system for changing digital and analog data signals from one form to the other.

A further object of the invention is to provide transistor switching means for selectively controlling the degree of attenuation without changing the output impedance.

According to the invention, an input signal from a low impedance source is applied across first and second lines, and a plurality of impedances are selectively coupled between a common output terminal and one of the lines. The value of each impedance is weighted in accordance with the significance of a related binary bit in a binary representation of a digital number. Each impedance is selectively coupled to the first and second lines when the binary digit of associated significance is One and Zero, respectively. The digitally attenuated output signal is derived between the output terminal and the second line. However, since the first line is coupled to the second line by the low impedance source, the impedance between the output terminal and second line is substantially the impedance presented by the parallel combination of all the impedances. When used for digital-to-analog conversion, the signal amplitude applied across the first and second lines is substantially constant.

Other features, objects and advantages of the invention will become apparent from the following specification when read in connection with the accompanying drawing in which.

Figure 1:
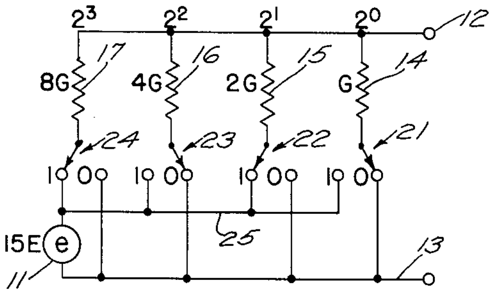
Fig. 1 is a schematic circuit diagram of an exemplary embodiment of the invention.

With reference now to the drawing, and more particularly Fig. 1 thereof, there is illustrated a schematic circuit diagram of an exemplary embodiment of the invention which attenuates an input signal from voltage source 11 in accordance with the value of a four-digit binary number to provide the attenuated signal between output terminal 12 and common line 13. Resistances 14, 15, 16 and 17 having conductances G, 2G, 4G and 8G, respectively, are connected from terminal 12 to respective single-pole double throw switches 21, 22, 23 and 24. Each of the latter switches has a One terminal connected to One line 25 and a Zero terminal connected to Zero line 13. Voltage source 11 is connected between One line 25 and Zero line 13.

The preceding description of the circuit arrangement should facilitate understanding the mode of operation whereby selective digital attenuation of an input signal is provided at constant output impedance. The operation will be better understood by considering a specific example wherein it is desired to attenuate the input signal in accordance with the binary number representation of the decimal number ten. Since a four digit binary number is capable of representing the zeroth and fifteen finite amplitude levels, it is convenient to designate the instantaneous amplitude level of source 11 as 15E. The voltage level between output terminal 12 and line 13 is then an integral number from zero to fifteen times E, depending upon which of the levels is represented by the setting of the switches.

The binary number corresponding to decimal ten is 1010. This number is represented by setting switches 24 and 22 in the One position and switches 23 and 21 in the Zero position. Under these conditions, the parallel combination of resistances 15 and 17 is in series with output terminal 12 and One line 25 while the parallel combination of resistances 14 and 16 is in series with terminal 12 and Zero line 13, as shown in Fig. 2.

Figure 2:
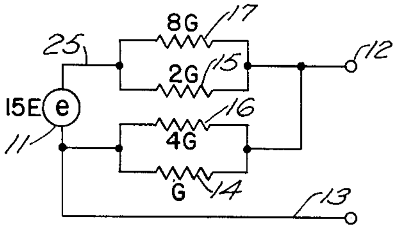
Fig. 2 is an equivalent circuit of the arrangement of Fig. 1 with the switches connected as shown therein.
Figure 3:
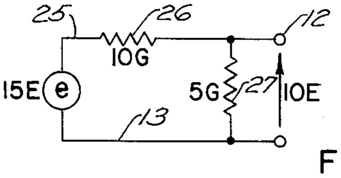
Fig. 3 is the simplified equivalent of the circuit of Fig. 2.

Referring to Fig. 3, the parallel combinations of Fig. 2 are lumped together to show in simplified form the resulting attenuator when decimal ten is binarily represented by the switch positions. A conductance 26 of 10G mhos is in series with voltage source 11 and output terminal 12. A conductance 27 of 5G mhos is connected between terminal 12 and line 13. Since the voltage divides inversely as the ratio of conductances, ⅔ of the input voltage, or 10E appears across conductance 27. If the switches are changed to represent a different decimal number, the voltage derived between terminal 12 and line 13 will be that number times E.

As indicated above, the output impedance is independent of the particular binary number represented. This will be better understood by recognizing that in accordance with Thevenin's theorem, any two terminal linear network may be represented by an equivalent circuit consisting of a voltage source in series with an equivalent admittance, the equivalent admittance being determined by shorting all voltage sources within the network and open circuiting current sources. In the circuit of Fig. 3, voltage source 11 is shorted in determining this equivalent admittance. Therefore, the output admittance between terminal 12 and line 13 is the parallel combination of conductances 26 and 27 in parallel, or 15G mhos. Moreover, if the circuit of Fig. 1 is examined, it is seen that One line 25 and Zero line 13 are connected together by voltage source 11. Hence, for purposes of determining the output admittance, the switch positions make no difference and the output admittance for the configuration of Fig. 1 is always 15G mhos.

Figure 4:
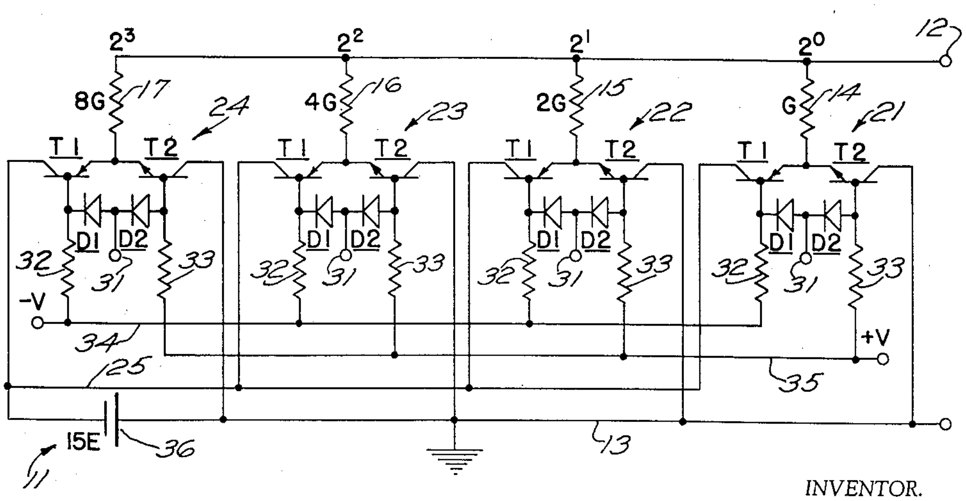
Fig. 4 is a schematic circuit diagram of the novel attenuator using complementary transistors for switching.

With reference to Fig. 4, there is shown a digital attenuator consisting of four identical stages having a pair of complementary transistors functioning as a single-pole double-throw switch. Since the stages are identical, the individual circuit components co-operating with the transistors to switch the respective stage resistances to the appropriate line are designated by the same reference symbol. PNP transistor T1 and NPN transistor T2 have their emitters connected to respective attenuating resistances 14, 15, 16 and 17. Switching terminal 31 is coupled to the bases of transistors T1 and T2 by diodes D1 and D2, respectively. Base current is delivered to the bases of transistors T1 and T2 through respective current limiting resistors 32 and 33 from lines 34 and 35, maintained at −V volts and +V volts, respectively. A battery 36 forms voltage source 11.

A switching signal is applied to terminal 31 to control which of the two transistors is conducting. Preferably, this signal should swing positive slightly more than 15E volts and negative just below ground potential so that the connected-together emitters are at all times clamped to the potential of one of the battery 36 terminals. When terminal 31 is positive, diodes D1 and D2 are respectively conductive and nonconductive. The positive potential coupled through conducting diode D1 renders PNP transistor T1 non-conductive. Since diode D2 is nonconductive, the positive potential on line 35 coupled through current limiting resistor 33 renders NPN transistor T2 conductive. The latter resistor functions to establish the base current through the transistor at a value resulting in the conducting impedance of the transistor being minimized to maximize its effect as a switch.

When the potential on terminal 31 is below ground potential, the diodes and transistors reverse conducting states. The negative potential on line 34 is then coupled to the base of transistor T1 through current limiting resistor 32 to render this transistor conductive at minimum conducting impedance.

The novel attenuator has been used in association with other circuitry in a fully transistorized analog-to-digital converter to convert input analog signals into corresponding eleven bit binary numbers at a rate of 18,000 conversions per second to an accuracy of .05%. Numerous other uses will be suggested to those in the computer art.

The specific embodiments described herein are by way of example. It is evident that those skilled in the art may now make numerous modifications of and departures from such embodiments without departing from the inventive concepts. Consequently, the invention is to be construed as limited only by the spirit and scope of the appended claim.

What is claimed is:

Signal translating apparatus for attenuating the amplitude of an input signal in accordance with a digital number having a plurality of binary bits comprising, a source of said input signal, first and second lines, means for applying said input signal across said first and second lines, an output terminal, an impedance for each of said binary bits having one end coupled to said output terminal, the value of each said impedance being related to the weighting of the associated bit, pairs of complementary switching transistors for coupling the other end of each of said impedances to a selected one of said first and second lines to provide said input signal attenuated between said output terminal and a predetermined one of said lines, the impedance between said output terminal and said predetermined line being independent of the line to which said other ends are coupled, said complementary pairs of transistors comprising, PNP and NPN transistors each having base, emitter and collector electrodes with the emitters connected to said other end of an associated one of said impedances, sources of negative and positive potential, first and second current limiting resistances respectively connected from said PNP transistor base to said negative potential source and from said NPN transistor base to said positive potential source, a switching input terminal, first and second diodes connected from said switching input terminal to said PNP transistor base and said NPN transistor base respectively said first and second diodes being poled to be conductive and nonconductive respectively for one potential level at said switching input terminal and non-conductive and conductive respectively for another potential level at said switching input terminal, each of said diodes when rendered conductive clamping the associated base to prevent the associated transistor from conducting, and means for connecting said collectors to respective ones of said first and second lines.

References Cited in the file of this patent

UNITED STATES PATENTS

| | | |
|---|---|---|
| 2,738,504 | Gray | Mar. 13, 1956 |
| 2,802,938 | Herzog | Aug. 13, 1957 |
| 2,851,604 | Clapper | Sept. 9, 1958 |
| 2,863,123 | Koch | Dec. 2, 1958 |
| 2,864,961 | Lohman | Dec. 16, 1958 |